United States Patent [19]

Engel et al.

[11] Patent Number: 5,265,331
[45] Date of Patent: Nov. 30, 1993

[54] METHOD OF MANUFACTURING A PISTON FOR AN AXIAL PISTON FLUID TRANSLATING DEVICE

[75] Inventors: William K. Engel, Peoria; Guy C. Carlson, Jr., Minooka; Howard Savage; David P. Smith, both of Joliet; Phillip J. Wenger, Crest Hill, all of Ill.

[73] Assignee: Caterpillar Inc., Peoria, Ill.

[21] Appl. No.: 822,003

[22] Filed: Jan. 16, 1992

[51] Int. Cl.$^5$ ............... B23P 15/00; F01B 31/00
[52] U.S. Cl. ............... 29/888.044; 29/888.04; 29/157; 29/260; 29/110; 228/247
[58] Field of Search ............... 92/157, 109, 110, 176, 92/181 R, 255, 257, 258, 260, 158; 29/888.04, 888.042, 888.044; 228/135, 245, 247; 566/566

[56] References Cited

U.S. PATENT DOCUMENTS

| | | | |
|---|---|---|---|
| 2,752,213 | 6/1956 | Swart et al. | 92/260 X |
| 3,319,575 | 5/1967 | Havens | 92/260 X |
| 3,367,277 | 2/1968 | Andrews et al. | 92/157 X |
| 3,828,654 | 8/1974 | Wietkoff | 92/255 X |
| 4,191,095 | 3/1980 | Heyl | 92/158 X |
| 4,216,704 | 8/1980 | Heyl | 92/158 X |
| 4,604,945 | 8/1986 | Mizuhara | 92/260 X |
| 4,732,310 | 3/1988 | Umeha et al. | 228/135 |
| 5,076,148 | 12/1991 | Adler | 29/888.042 X |
| 5,094,149 | 3/1992 | Munro | 92/260 X |

OTHER PUBLICATIONS

M. J. Fletcher, PhD, *Vacuum Brazing*, Published By Mills & Boon Limited, pp. 2-63, 1971.

*Primary Examiner*—Edward K. Look
*Assistant Examiner*—Hoang Nguyen
*Attorney, Agent, or Firm*—Diana L. Charlton

[57] ABSTRACT

Hydraulic piston pumps and motors are used in various applications to power implements, steering, propel, and auxiliary systems. However, it is important to keep the piston weight and compressible fluid volume low in order to have a smaller more efficient pump. The subject piston is manufactured in a simple manner to achieve a reliable, light weight design. The piston has a cylindrical body having an outer surface. The piston is manufactured by forming a first bore having a large diameter in the body extending from the outer surface and terminating at an annular shoulder. A second bore is formed which extends from the annular shoulder to a predetermined depth. A tube is inserted through the bore and extends a predetermined distance into the second bore. A cap has a bore and is positioned on the body in abutment with at least a portion of the outer surface. The cap slidably receives the tube through the bore. The cap is brazed to the body and the tube is brazed to the cap and to the body to form an isolated annular cavity in the piston.

1 Claim, 2 Drawing Sheets

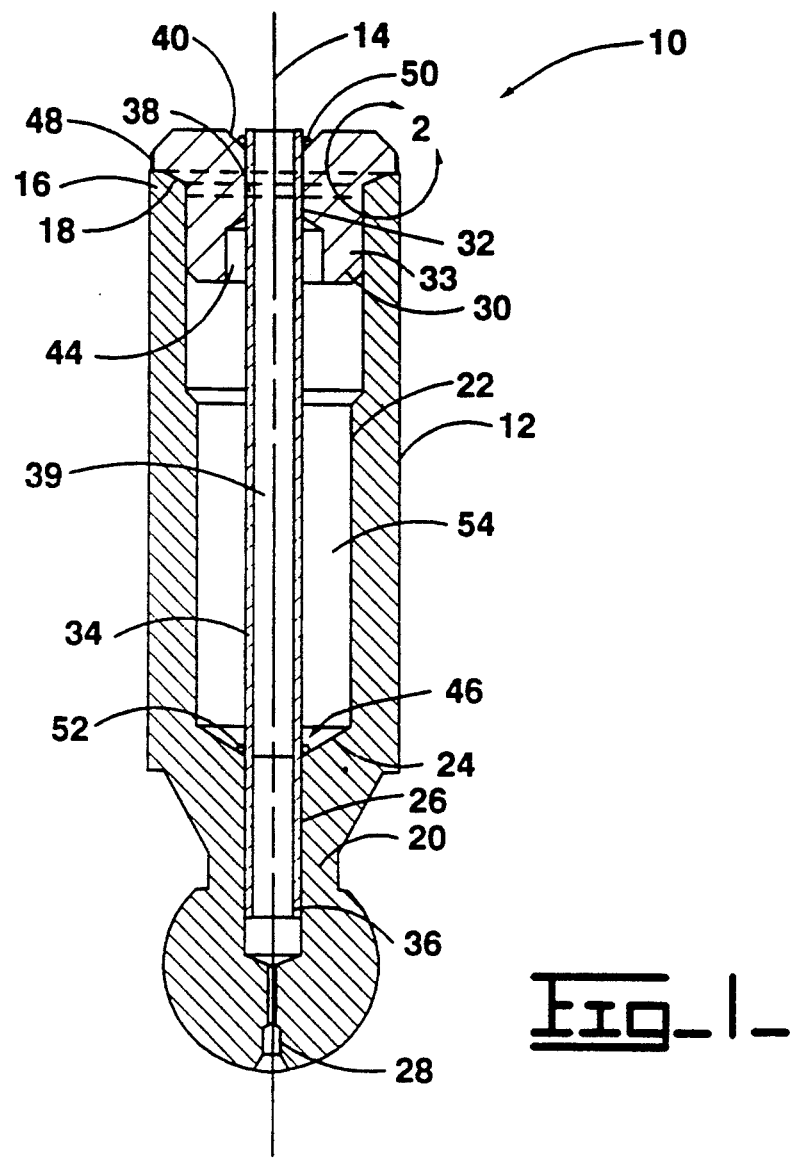
Fig_1_
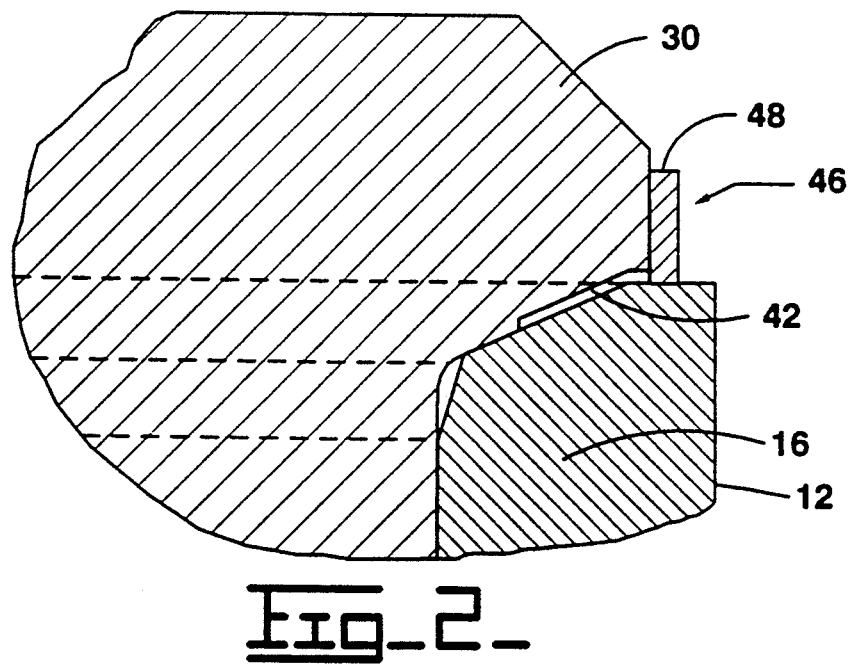
Fig_2_

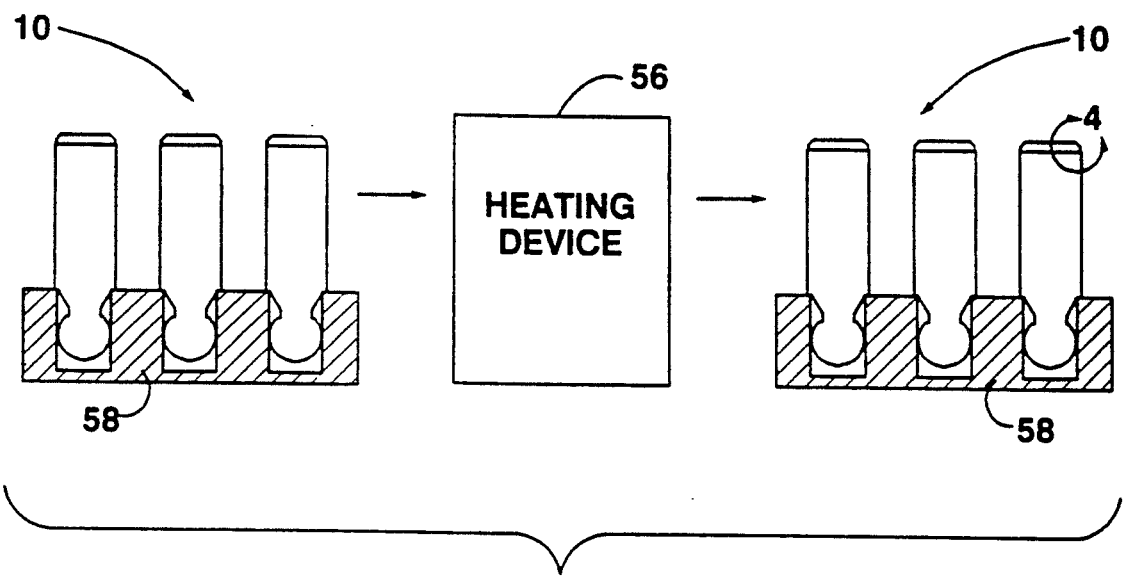
Fig_3_
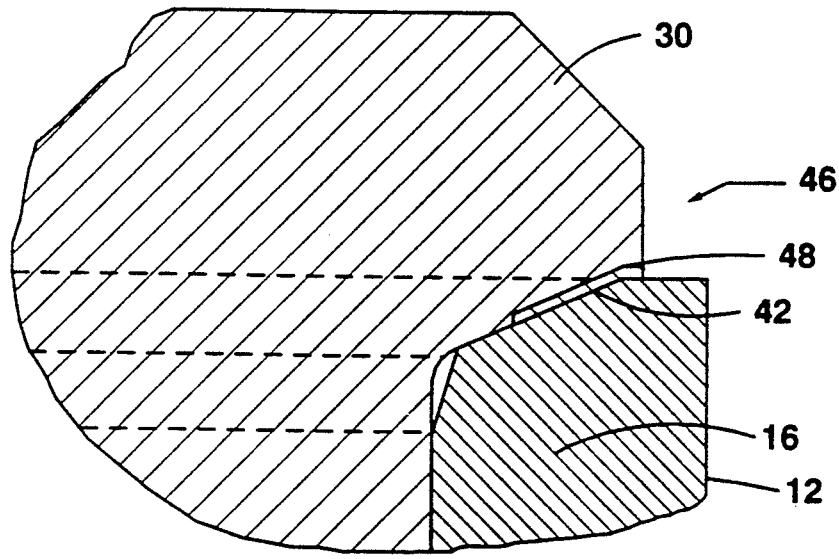
Fig_4_

METHOD OF MANUFACTURING A PISTON FOR AN AXIAL PISTON FLUID TRANSLATING DEVICE

DESCRIPTION

1. Technical Field

This invention relates to axial piston fluid translating devices and more particularly to a method of manufacturing the piston thereof.

2. Background Art

Fluid translating devices are designed for various applications such as hydrostatic drives, hydraulically actuated implements, and steering systems. The term "pump" as used herein is intended to include hydraulic motors. In order to function in the most efficient manner for the applications mentioned above, the pumps are manufactured with specific requirements. One of these requirements is the use of light weight pistons within the pump. A light weight piston is essential in reducing forces, such as inertia and friction, allowing the piston to move at a faster rate. The faster piston with reduced forces is able to displace more fluid, and therefore, the pump is more efficient and can be manufactured at a reduced size with a performance equivalent to a larger piston pump. The reduced sized pump and higher efficiency allows competitive application of the hydraulic piston pump.

Many of the known prior art pump designs lighten the piston weight by drilling a large diameter hole in the top end of the piston. However, in these designs the pumped fluid is then able to occupy the drilled hole space, thereby adding the compressible volume of fluid to the piston. The addition of the fluid in the piston reduces efficiency of the pump.

Other known prior art designs lighten the piston by the same method as specified above, but then fill the hole with a plastic or light weight material. Although filling the hole with a plastic or light weight material may reduce a significant amount of weight, the material used and the retention method may compromise the reliability and cost of the piston. The plastic material may wear or deteriorate producing fragments which block the lubrication passages within the piston, pump, and circuit. The retention method must withstand many pressure cycles, and if unable, may also lead to failure of the pump. The plastic or light weight material and the retention method increase the cost of the piston.

The present invention is directed to overcoming one or more of the problems as set forth above.

DISCLOSURE OF THE INVENTION

In one aspect of the present invention, a method of manufacturing a piston for a fluid translating device is provided. The piston has a cylindrical body having a longitudinal axis and which defines a pumping end portion having an outer surface and a mounting end portion. The steps for manufacturing the piston for the fluid translating device includes forming a first bore having a predetermined diameter in the body and which is disposed coaxially with the longitudinal axis. The first bore extends from the outer surface and terminates at an annular shoulder in close proximity to the mounting end portion. A second bore is formed which extends from the annular shoulder and terminates within the mounting end portion to a predetermined depth, the second bore has a diameter smaller than the diameter of the first bore. A cap having a bore is positioned on the pumping end portion of the body in abutment with at least a portion of the outer surface of the body. A tube extends longitudinally through the first bore and has an inner end portion which is inserted a predetermined distance into the second bore and an outer end portion which is inserted into the bore of the cap. The cap is bonded to the body and the tube is bonded to the cap and to the body.

In another aspect of the invention, a piston is provided which is adapted for use in a fluid translating device. The piston has a cylindrical body having a longitudinal axis and defines a pumping end portion having an outer surface and a mounting end portion. The body has a first bore having a predetermined diameter which is disposed coaxially with the longitudinal axis. The first bore extends from the outer surface and terminates at an annular shoulder in close proximity to the mounting end portion. A second bore is defined within the mounting end portion and extends from the annular shoulder to a predetermined depth and has a diameter smaller than the diameter of the first bore. A cap is positioned on the pumping end portion of the body in abutment with at least a portion of the outer surface of the body, the cap having a bore therethrough. A tube extends longitudinally through the first bore and has a inner end portion extending a predetermined distance into the second bore and an outer end portion extending into the bore in the cap. A means is included for bonding the cap to the body and the tube to the cap and to the body so that an annular cavity is formed within the piston.

BRIEF DESCRIPTION OF THE DRAWINGS

FIG. 1 is a diagrammatic sectional view of an embodiment of the present invention.

FIG. 2 is an enlarged view of the area encompassed by the line 2 of FIG. 1.

FIG. 3 is a diagrammatic view of a plurality of the embodiment of FIG. 1 being arranged in a fixture before and after a heating operation.

FIG. 4 is an enlarged view of the area encompassed by line 4 of FIG. 3, illustrating the effects of the heating operation on the embodiment.

BEST MODE FOR CARRYING OUT THE INVENTION

A piston for a axial piston fluid translating device such as a hydraulic pump or motor is diagrammatically illustrated at 10 and has a cylindrical body 12 having a longitudinal axis 14. The term hydraulic pump as used herein is intended to include hydraulic motors. The piston defines a pumping end portion 16 having an outer surface 18 and a mounting end portion 20 having a generally spherical shape typically used to mount a piston slipper (not shown). The body 12 defines a first bore 22 which has a predetermined diameter and is disposed coaxially with the longitudinal axis 14. The first bore 22 extends from the outer surface 18 and terminates at an annular shoulder 24 in close proximity to the mounting end portion 20. A second bore 26 is defined within the mounting end portion 20 and extends from the annular shoulder 24 to a predetermined depth. The second bore 26 has a diameter smaller than the diameter of the first bore 22. An orifice 28 is defined within the mounting end portion 20 and is hydraulically connected to the second bore 26. A cap 30 has a bore 32 and a pilot portion 33 and is positioned on the pumping end portion 16 of the body 12 and is in abutment with at least a portion of the outer surface 18 of the body 12. A tube 34 extends longitudinally through the first bore 22 and has an inner end portion 36 and an outer end portion 38 with the tube 34 defining a lubrication passage 39. The inner end portion 36 extends a predetermined distance into the second bore 26 and the outer end portion 38 extends into the bore 32 of the cap 30. The cap 30 has a recess 40 which extends inwardly of the outer end portion 38 of the tube 34. The recess 40 is illustrated as a large conical chamfer at the outer end of the bore 32, however, it may be of any suitable shape. The cap 30 and the body 12 define a channel portion 42, shown in FIG. 2, which extends a predetermined distance along the outer surface 18 of the body 12. The cap 30 defines a pocket 44 which extends outwardly from the first bore 22 a predetermined distance into the cap 30.

A means 46 is provided for bonding the cap 30 to the body 12 and the tube 34 to the cap 30 and to the body 12. The means 46 may be, for example, a plurality of brazed metal bonds or a brazed coating on the cap 30 and the tube 34, although any suitable method of bonding may be used. The bonding means 46 may also include an interference or press fit between the tube 34 and the cap 30 and the tube 34 and the body 12. It should be noted that FIGS. 1 and 2 illustrate the present invention before the occurrence of the bonding process. A first braze ring 48 is placed at the pumping end portion 16 around the cap 30 in order to eventually bond the cap 30 to the body 12. A second braze ring 50 is placed around the tube 34 within the recess 40 of the cap 30 in order to eventually bond the tube 34 to the cap 30. A third braze ring 52 is placed at the juncture of the annular shoulder 24 with the second bore 26 and around the tube 34 in order to eventually bond the tube 34 to the body 12. The eventual bonds formed by the braze rings 48, 50, and 52 define an isolated annular cavity 54 within the piston 10.

FIG. 3 is an illustration depicting an arrangement of a plurality of the pistons 10 of FIG. 1 before and after heating in a furnace 56 or other suitable heating device. A fixture 58 is required to hold the pistons 10 in a vertical position before, during, and after the heating process in the furnace 56 and may be similar to the one shown, although it should be recognized that any suitable fixturing device can be used. It should also be noted that the reference numerals shown in FIGS. 1 and 2 are applicable to FIG. 3, although the numerals are not shown for reasons of clarification.

FIG. 4 is an enlarged sectional view of the area encompassed by line 4 of FIG. 3 and illustrates the effects of the heating operation on the braze ring 48 and the subsequent bond formed between the cap 30 and the body 12. It should be understood that the effects of the heating operation 56 will produce similar results with the remaining braze rings 50, 52.

Industrial Applicability

To begin manufacturing of the piston 10, the first bore 22 is formed in the body 12 and the second bore 26 is formed from the annular shoulder 24 of the bore 22 to the predetermined depth. The second bore 26 being at a sufficient depth to communicate with the orifice 28. The piston 10 is positioned vertically and the tube 34 is inserted through the first bore 22 and into the second bore 26 to the predetermined depth. The tube 34 may be made from a material, such as steel, or other suitable materials of adequate strength and hardness. The braze ring 52 is placed around the tube 34 at the juncture of the annular shoulder 24 with the second bore 26. The braze ring material may be made from any suitable brazing material, preferably silver. The bore 32 of the cap 30 slidably receives the tube 34 as the cap 30 is positioned on the pumping end portion 16 of the piston 10. The pilot portion 33 of the cap 30 is pressed or slid into the bore 22 in abutment with the outer surface 18 of the body 12. The pocket 44 of the cap 30 is provided to reduce the weight of the cap 30, and subsequently, the piston 10. The braze ring 48 is placed at the pumping end portion 16 around the cap 30. The braze ring 50 is placed around the tube 34 within the recess 40 of the cap 30.

A plurality of pistons 10 are vertically held in the fixture 58 and are heated in a conventional manner to the melting temperature of the braze rings 48, 50, and 52. The pistons 10 are then cooled sufficiently to solidify the braze material achieving a fluid tight bond so that the sealed annular cavity 54 is formed within the piston 10. A quenching process may be used after the heating operation 56 in order to harden the steel.

In view of the above, it is readily apparent that the present invention provides an improved piston for fluid translating devices such as hydraulic pumps and motors in which the weight of the piston is reduced in a reliable manner to provide a more effective fluid translating device. This is accomplished by forming a large diameter bore within the body of the piston and a smaller diameter bore from the large diameter bore to the mounting end portion of the piston. A tube is positioned through the large diameter bore and into the smaller diameter bore. The cap is brazed to the body and the tube is brazed to the cap and to the body providing a fluid tight bond so that an isolated annular cavity is formed within the piston. This effectively reduces the weight of the piston so that the pump can work more efficiently. The present invention is an improved piston for axial piston fluid translating devices which is manufactured in a simple and low cost manner to provide a reliable, light weight design.

Other aspects, objects, and advantages of this invention can be obtained from a study of the drawings, the disclosure, and the appended claims.

I claim:

1. A method of manufacturing a piston for a fluid translating device, the piston has a cylindrical body having a longitudinal axis and defining a pumping end portion having an outer surface and a mounting end portion, the improvement comprising the steps of:

forming a first bore having a predetermined diameter in the body and being disposed coaxially with the longitudinal axis, the first bore extending from the outer surface and terminating at an annular shoulder in close proximity to the mounting end portion;

forming a second bore extending from the annular shoulder and terminating within the mounting end portion to a predetermined depth and the second bore having a diameter smaller than the diameter of the first bore;

inserting a tube longitudinally through the first bore and having an outer end portion and an inner end portion, the inner end portion extending a predetermined distance into the second bore and the tube defining a lubrication passage extending from the pumping end portion and terminating within the mounting end portion;

holding the piston in a vertical position;

placing a braze ring at the juncture of the annular shoulder with the tube;

inserting a pilot portion of a cap into the first bore and seating the cap on the pumping end portion of the body in abutment with at least a portion of the outer axial surface of the body, the cap having a bore wherein the outer end portion of the tube extends therethrough;

placing a braze ring at the pumping end portion around the cap;

placing a braze ring around the tube within the recess in the cap; and brazing the cap to the outer axial surface of the body, brazing the tube to the cap, and brazing the tube to the body by heating the piston to a melting temperature of the braze rings and cooling the piston so that the braze rings solidify to form an isolated annular cavity within the piston.

* * * * *